United States Patent
Wang et al.

(10) Patent No.: US 12,418,763 B1
(45) Date of Patent: Sep. 16, 2025

(54) MULTI-ROOM AUDIO SYNCHRONOUS PLAYBACK METHOD, SYSTEM, DEVICE, AND STORAGE MEDIUM

(71) Applicant: Linkplay Technology Inc., Newark, CA (US)

(72) Inventors: Huaijing Wang, Newark, CA (US); Lifeng Zhao, Newark, CA (US)

(73) Assignee: Linkplay Technology Inc.

( * ) Notice: Subject to any disclaimer, the term of this patent is extended or adjusted under 35 U.S.C. 154(b) by 0 days.

(21) Appl. No.: 19/192,446

(22) Filed: Apr. 29, 2025

(30) Foreign Application Priority Data

Jun. 25, 2024 (CN) .......................... 202410827282.6

(51) Int. Cl.
  *H04S 7/00* (2006.01)
  *G06F 1/12* (2006.01)
  *H04W 84/18* (2009.01)

(52) U.S. Cl.
  CPC ............... *H04S 7/30* (2013.01); *G06F 1/12* (2013.01); *H04W 84/18* (2013.01)

(58) Field of Classification Search
  CPC .......... G06F 3/162; G06F 3/165; G06F 16/68; G06F 17/00
  USPC .......................................................... 700/94
  See application file for complete search history.

(56) References Cited

U.S. PATENT DOCUMENTS 9,866,964 B1   1/2018  Haskin et al.
2016/0316418 A1*  10/2016  Torab Jahromi ...... H04L 45/566
2018/0007091 A1*  1/2018  Rajapakse ............ H04L 12/189
2019/0007253 A1*  1/2019  Cavalcanti ........... H04L 5/0041
2022/0189677 A1*  6/2022  Blay ....................... H03H 7/42
2022/0264222 A1   8/2022  Chatelet et al.

FOREIGN PATENT DOCUMENTS

| CN | 103581816 A | 2/2014 |
| CN | 109151987 A | 1/2019 |
| CN | 113395305 A | 9/2021 |
| CN | 115766313 A | 3/2023 |
| CN | 118102434 A | 5/2024 |

* cited by examiner

*Primary Examiner* — Alexander Krzystan (74) *Attorney, Agent, or Firm* — Bayramoglu Law Offices LLC (57) ABSTRACT

A multi-room audio synchronous playback method, a system, a device and a storage medium are provided. The multi-room audio synchronous playback method includes: creating an ad-hoc network using a plurality of audio devices supporting a target wireless communication protocol via point-to-point connection, the ad-hoc network covering a plurality of rooms, the target wireless communication protocol operating at a frequency band of 5 GHz to 7 GHz; dynamically analyzing link quality to select an optimum transmission path, and dynamically optimizing a network topology of the ad-hoc network via multi-hop relay; transmitting target audio data between the audio devices of the ad-hoc network based on the optimum transmission path, and performing real-time interaction and dynamic compensation based on a synchronization signal to obtain a synchronization parameter; and controlling each audio device of the ad-hoc network based on the synchronization parameter to synchronously play the target audio data.

13 Claims, 4 Drawing Sheets

```
┌─────────────────────────────────────────────────────────────────────┐
│ creating an ad-hoc network using a plurality of audio devices supporting a │ ─ 101
│ target wireless communication protocol via point-to-point connection, the │
│    ad-hoc network covering a plurality of rooms, and the target wireless  │
│   communication protocol operating at a frequency band of 5 GHz to 7 GHz  │
└─────────────────────────────────────────────────────────────────────┘
                                    ▼
┌─────────────────────────────────────────────────────────────────────┐
│ dynamically analyzing link quality to select an optimum transmission path, │ ─ 102
│  and dynamically optimizing a network topology of the ad-hoc network via   │
│                             multi-hop relay                                │
└─────────────────────────────────────────────────────────────────────┘
                                    ▼
┌─────────────────────────────────────────────────────────────────────┐
│    transmitting target audio data between the audio devices of the ad-hoc │ ─ 103
│ network based on the optimum transmission path, and performing real-time  │
│ interaction and dynamic compensation based on a synchronization signal to │
│                      obtain a synchronization parameter                   │
└─────────────────────────────────────────────────────────────────────┘
                                    ▼
┌─────────────────────────────────────────────────────────────────────┐
│     controlling each audio device of the ad-hoc network based on the      │ ─ 104
│  synchronization parameter to synchronously play the target audio data    │
└─────────────────────────────────────────────────────────────────────┘
```

MULTI-ROOM AUDIO SYNCHRONOUS PLAYBACK METHOD, SYSTEM, DEVICE, AND STORAGE MEDIUM

CROSS REFERENCE TO THE RELATED APPLICATIONS

This application is based upon and claims priority to Chinese Patent Application No. 202410827282.6, filed on Jun. 25, 2024, the entire contents of which are incorporated herein by reference.

TECHNICAL FIELD

The present disclosure relates to the field of audio playback technology, in particular to a multi-room audio synchronous playback method, a system, a device and a storage medium.

BACKGROUND

Usually, in a conventional multi-room audio system, a household wireless fidelity (WiFi) router is used as a data center, and an audio device is connected to the router via such a protocol as Digital Living Network Alliance (DLNA) or Airplay, so as to transmit an audio stream and perform synchronization control.

In a conventional networking mode, on one hand, it is difficult to ensure connection stability and a transmission rate due to an interference in a network environment. On the other hand, due to the limited router performance, it is difficult to support the real-time transmission of multi-channel, high-resolution audio, and there are such problems as a large playback delay and an obvious sound quality loss, so it is impossible to meet the requirement on high-quality music.

SUMMARY

An object of the present disclosure is to provide a multi-room audio synchronous playback method, a system, a device and a storage medium, so as to prevent the occurrence of asynchronous playback for different soundboxes in multiple rooms in a case that a same piece of music is played.

In one aspect, the present disclosure provides in some embodiments a multi-room audio synchronous playback method, including: creating an ad-hoc network using a plurality of audio devices supporting a target wireless communication protocol via point-to-point connection, the ad-hoc network covering a plurality of rooms, the target wireless communication protocol operating at a frequency band of 5 GHz to 7 GHz; dynamically analyzing link quality to select an optimum transmission path, and dynamically optimizing a network topology of the ad-hoc network via multi-hop relay; transmitting target audio data between the audio devices of the ad-hoc network based on the optimum transmission path, and performing real-time interaction and dynamic compensation based on a synchronization signal to obtain a synchronization parameter; and controlling each audio device of the ad-hoc network based on the synchronization parameter to synchronously play the target audio data.

In another aspect, the present disclosure provides in some embodiments a multi-room audio synchronous playback system, including a plurality of audio devices supporting a target wireless communication protocol. The plurality of audio devices forms an ad-hoc network covering a plurality of rooms via point-to-point connection, and the target wireless communication protocol operates at a frequency band of 5 GHz to 7 GHz. Each audio device includes: a network module configured to dynamically analyze link quality to select an optimum transmission path, and dynamically optimize a network topology of the ad-hoc network via multi-hop relay; a synchronization module configured to transmit target audio data between the audio devices of the ad-hoc network based on the optimum transmission path, and perform real-time interaction and dynamic compensation based on a synchronization signal to obtain a synchronization parameter; and a playback module configured to synchronously play the target audio data based on a playback time stamp carried in the synchronization signal.

In yet another aspect, the present disclosure provides in some embodiments a computer device, including a memory, a processor, and a computer program stored in the memory and executed by the processor. The computer program is executed by the processor to implement the above-mentioned multi-room audio synchronous playback method.

In still yet another aspect, the present disclosure provides in some embodiments a computer-readable storage medium storing therein an instruction. The instruction is executed by a computer to implement the above-mentioned multi-room audio synchronous playback method.

According to the embodiments of the present disclosure, the plurality of audio devices supporting the target wireless communication protocol forms the ad-hoc network covering a plurality of rooms via point-to-point connection, and each audio device dynamically analyzes the link quality to select the transmission path with a smallest delay and dynamically optimizes the network topology via multi-hop relay, so it is able to reduce a transmission delay, and transmit high-resolution audio data between the audio devices without any sound quality loss. In addition, the audio device performs the real-time interaction and the dynamic compensation based on the synchronization signal, so it is able to improve the synchronous playback accuracy, and meet the requirement on the synchronization between sound and image.

DETAILED DESCRIPTION OF THE EMBODIMENTS

An object of the present disclosure is to provide a multi-room audio synchronous playback method, a system, a device and a storage medium, so as to prevent the occurrence of asynchronous playback for different soundboxes in multiple rooms in a case that a same piece of music is played.

Such words as "first", "second", "third" and "fourth" involved in the specification, the appended claims and the drawings are merely used to differentiate different components rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other steps or units not listed herein, or may include any inherent steps or units of the procedure, method, system, product or device.

Figure 1:
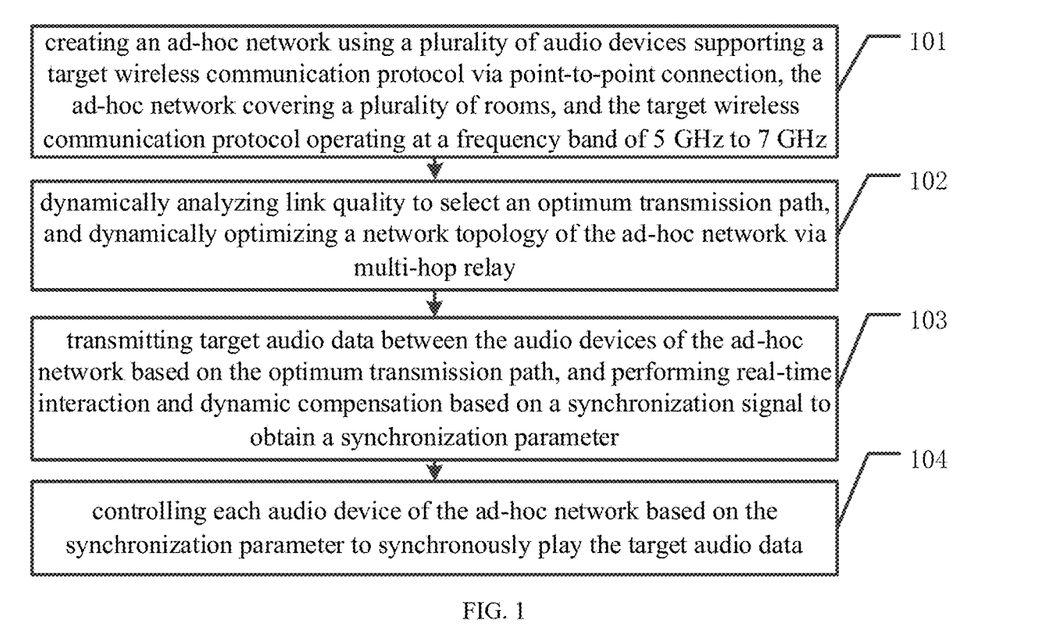
FIG. 1 is a flow chart of a multi-room audio synchronous playback method according to an embodiment of the present disclosure.

For ease of understanding, a specific process in the embodiments of the present disclosure will be described hereinafter. Referring to FIG. 1, the present disclosure provides in one embodiment a multi-room audio synchronous playback method, which includes the following steps.

Step 101: creating an ad-hoc network using a plurality of audio devices supporting a target wireless communication protocol via point-to-point connection. The ad-hoc network covers a plurality of rooms, and the target wireless communication protocol operates at a frequency band of 5 GHz to 7 GHz.

It should be appreciated that, the method in the embodiments of the present disclosure may be executed by a multi-room audio synchronous playback system, a terminal or a server, which will not be particularly defined herein. The following description will be given by taking the multi-room audio synchronous playback system as an example.

The multi-room audio synchronous playback in this embodiment of the present disclosure includes a plurality of audio devices located in a plurality of rooms. For example, for a household multi-room audio synchronous playback system, one audio device is located in a living room, one audio device is located in a kitchen, and the other audio devices are located in bedrooms.

The plurality of audio devices includes one or more of a television, a projector, a surround sound speaker, a bass speaker, or a soundbar. The audio device further includes a left-channel speaker and a right-channel speaker.

A network module is built in each audio device and supports the target wireless communication protocol operating at the frequency band of 5 GHz to 7 GHZ, e.g., WiFi 6E, WiFi 5 or WiFi 7. A high-speed, stable peer-to-peer network is established between the audio devices on their own initiatives independent of a common household router, and an optimized network topology and routing mechanism is adopted to remarkably reduce a data transmission delay.

Through the target wireless communication protocol supporting the frequency band of 5 GHz to 7 GHZ, as compared with a common frequency band of 2.4 GHz, it is able to reduce an intra-frequency interference, increase a data transmission rate, transmit the high-resolution audio data between the audio devices based on a high-bandwidth characteristic of the target wireless communication protocol, and ensure the sound quality.

In a possible embodiment of the present disclosure, the audio device supports a Direct Stream Digital (DSD) encoding protocol, so as to meet the requirement on high-resolution encoding.

In a possible embodiment of the present disclosure, the audio device supports an I2S transmission protocol for transmitting digital audio data between internal elements of the audio device. In the I2S transmission protocol, a data signal, a clock signal and a control signal are transmitted via a data signal line, a clock signal line and a channel selection signal line respectively.

In a possible embodiment of the present disclosure, the audio device includes a dual-core Central Processing Unit (CPU), a Digital Signal Processor (DSP) chip, a high-performance processing chip (e.g., BES2610), a 1 MB Static Random Access Memory (SRAM), and an 8 MB flash memory.

To be specific, one audio device is selected from the plurality of audio devices supporting the target wireless communication protocol as a primary audio device, and the primary audio device sends a group creation request to the other audio devices within a target playback range. In a case that there is at least one occupied audio device, a priority level of a first scenario mode corresponding to a multi-room audio playback request is compared with a priority level of a second scenario mode corresponding to each occupied audio device. In a case that the priority level of the first scenario mode is higher than the priority level of the second scenario mode, the occupied audio device is controlled to leave an occupied state and join a synchronous audio group corresponding to the primary audio device to create the ad-hoc network corresponding to the synchronous audio group, and delay compensation is determined between the primary audio device and each secondary audio device in the ad-hoc network.

The occupied state is used to indicate that the audio device, e.g., the secondary audio device, is currently performing another audio task or has already joined the other synchronous audio group.

In this embodiment of the present disclosure, the first scenario mode and the second scenario mode are used to indicate audio playback scenarios corresponding to two audio groups or two audio devices. The audio playback scenario includes an interactive talkback scenario (e.g., conference or phone call), a background music scenario, or a home theater scenario. The priority level of the audio playback scenario may be set according to a user's habit. For example, the priority level of the interactive talkback scenario is higher than the priority level of the home theater scenario, and the priority level of the home theater scenario is higher than the priority level of the background music scenario. In a case that the first scenario mode corresponding to the multi-room audio playback request is the interactive talkback scenario and the second scenario mode corresponding to the occupied audio device is the background music scenario, the occupied audio device is controlled to leave the occupied state and join the ad-hoc network corresponding to the multi-room audio playback request, so as to allocate audio playback resources in an intelligent manner, ensure the scenario with a higher priority level, and improve the flexibility of the multi-room audio synchronous playback system. In addition, it is unnecessary for a user to operate the audio devices one by one manually, so it is able to remarkably improve the user experience.

In this embodiment of the present disclosure, the primary audio device, as a control center of the multi-room audio synchronous playback system, takes charge of performing clock synchronization in the ad-hoc network, and receiving, processing and forwarding audio data, so the primary audio device is usually an audio device with best performance within the target playback range.

Step 102: dynamically analyzing link quality to select an optimum transmission path, and dynamically optimizing a network topology of the ad-hoc network via multi-hop relay.

In this embodiment of the present disclosure, the link quality is an index for evaluating performance of a communication link between the primary audio device and any secondary audio device in the ad-hoc network. The optimum transmission path between the primary audio device and any secondary audio device is determined based on network information about each audio device, and the optimum transmission path includes at least one audio device as a relay node, so as to forward the audio data in a relayed manner, thereby to adapt to a multi-room audio synchronous playback scenario. The network topology is dynamically optimized through monitoring the network information about each audio device and whether or not the audio device joins or leaves the synchronous audio group.

In this embodiment of the present disclosure, the link quality is dynamically analyzed to select a transmission path with a smallest delay, and the network topology is dynamically optimized via multi-hop relay, so as to control an end-to-end transmission delay to be within 10 ms, thereby to perform the audio synchronization in real time.

Step 103: transmitting target audio data between the audio devices of the ad-hoc network based on the optimum transmission path, and performing real-time interaction and dynamic compensation based on a synchronization signal to obtain a synchronization parameter.

The ad-hoc network includes one primary audio device and a plurality of secondary audio devices. The primary audio device receives to-be-played audio data sent by a user terminal or a wireless router, and performs encoding/decoding on the to-be-played audio data to obtain the target audio data. The target audio data is distributed by the primary audio device to the secondary audio devices based on the optimum transmission path.

A format of the target audio data is a 24 bit/192 kHz pulse code modulation (PCM) format.

It should be appreciated that, delay compensation between the primary audio device and each secondary audio device of the ad-hoc network refers to compensation on a transmission delay of the audio data based on the network topology and characteristics of each audio device to achieve the synchronous playback. The delay compensation between the primary audio device and each secondary audio device is determined to ensure the synchronization accuracy of the ad-hoc network.

In this embodiment of the present disclosure, the synchronization parameter includes a target playback time stamp corresponding to each audio device, and it is used to control the audio devices of the ad-hoc network to perform the synchronous playback.

To be specific, any audio device of the ad-hoc network is determined as a reference clock device, and the synchronization signal including the reference playback time stamp is broadcast based on a predetermined clock synchronization period. Clock synchronization is performed on a target audio device and the reference clock device based on a predetermined target filtration algorithm, and the target playback time stamp corresponding to the target audio device is determined based on the reference playback time stamp. The target audio device is an audio device for receiving the synchronization signal in the ad-hoc network.

Step 104: controlling each audio device of the ad-hoc network based on the synchronization parameter to synchronously play the target audio data.

To be specific, a playback time stamp corresponding to each audio device of the ad-hoc network is determined based on the synchronization parameter, and then the target audio data is played by each audio device of the ad-hoc network based on a local clock after synchronization and the playback time stamp corresponding to each audio device.

According to the embodiments of the present disclosure, the plurality of audio devices supporting the target wireless communication protocol forms the ad-hoc network covering a plurality of rooms via point-to-point connection, and each audio device dynamically analyzes the link quality to select the transmission path with a smallest delay and dynamically optimizes the network topology via multi-hop relay, so it is able to reduce a transmission delay, and transmit high-resolution audio data between the audio devices without any sound quality loss. In addition, the audio device performs the real-time interaction and the dynamic compensation based on the synchronization signal, so it is able to improve the synchronous playback accuracy, and meet the requirement on the synchronization between sound and image.

Figure 2:
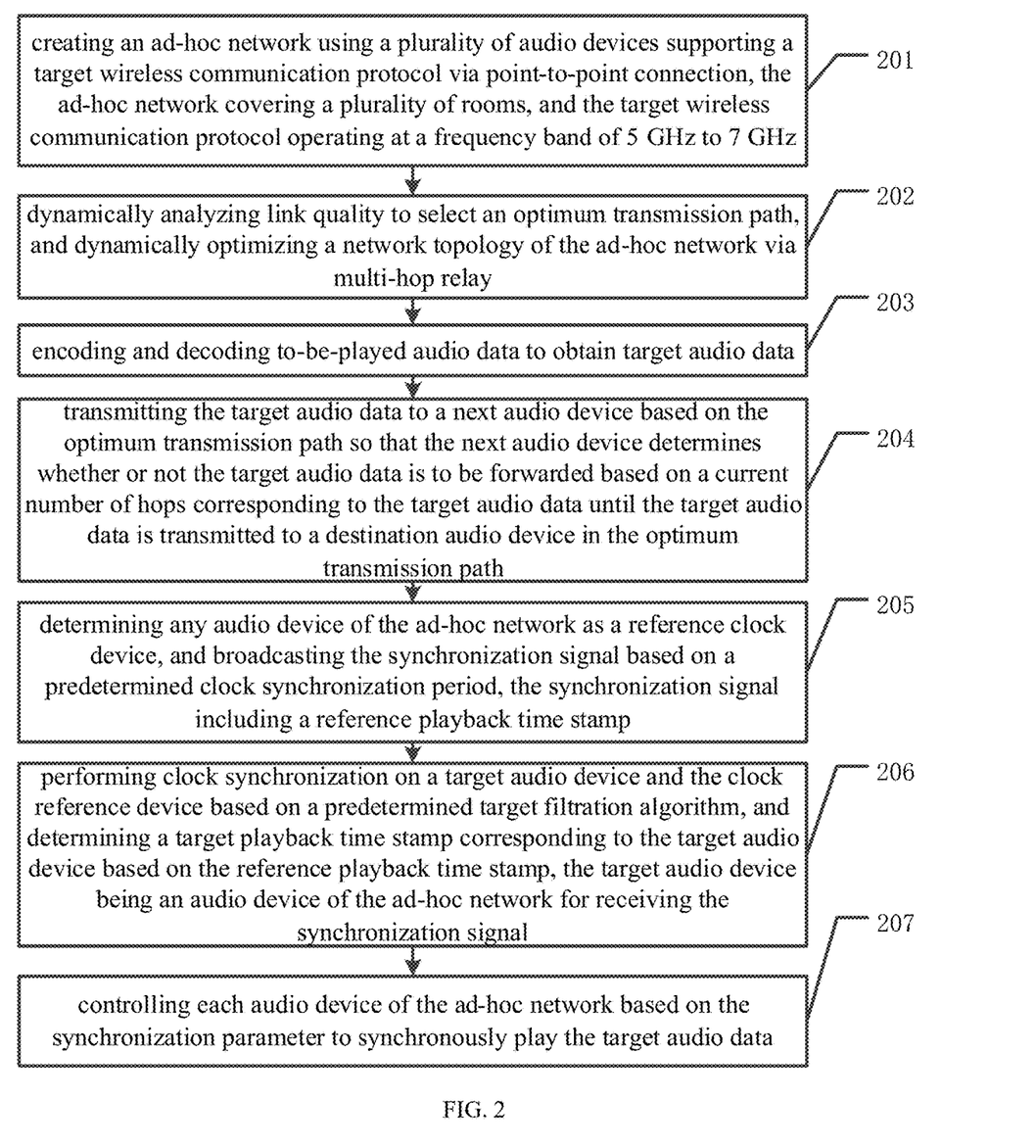
FIG. 2 is another flow chart of the multi-room audio synchronous playback method according to an embodiment of the present disclosure.

Referring to FIG. 2, the present disclosure further provides in another embodiment a multi-room audio synchronous playback method, which includes the following steps.

Step 201: creating an ad-hoc network using a plurality of audio devices supporting a target wireless communication protocol via point-to-point connection. The ad-hoc network covers a plurality of rooms, and the target wireless communication protocol operates at a frequency band of 5 GHz to 7 GHz.

The implementation of Step S201 may refer to that of Step 101, and thus will not be particularly defined herein.

Step 202: dynamically analyzing link quality to select an optimum transmission path, and dynamically optimizing a network topology of the ad-hoc network via multi-hop relay.

In this embodiment of the present disclosure, in a case of dynamically analyzing the link quality to select the optimum transmission path, an optimum path selection algorithm based on weighted link quality is presented. Through this algorithm, a weighted connected graph is created by using the audio devices as nodes, and two key indices, i.e., signal strength and a delay of a link, are both taken into consideration, so as to quantitatively evaluate the transmission quality of different transmission paths, thereby to select the optimum transmission path with a smallest delay and a highest anti-interference capability.

To be specific, any audio device of the ad-hoc network is determined as a primary audio device. The primary audio device detects neighboring audio devices based on a first predetermined period to obtain network information about each secondary audio device, and broadcasts network information about the primary audio device to the neighboring audio devices. A link quality score between any two audio devices is determined based on the network information about each audio device using an equation $L_i(X_i, X_j) = \alpha * Q_{ij} + \beta * D_{ij}$, where $L_i(X_i, X_j)$ represents a link quality score between an audio device $X_i$ and an audio device $X_j$, $Q_{ij}$ represents signal strength of a link between $X_i$ and $X_j$, $D_{ij}$ represents a link delay, and $\alpha$ and $\beta$ are weighting coefficients. A weighted connected graph is created based on the link quality, and a transmission path in which a sum of the link quality scores from the primary audio device to each secondary audio device is maximum is determined as the optimum transmission path. In a case that the network topology of the ad-hoc network changes, the optimum transmission path for the primary audio device and each secondary audio device is updated.

In this embodiment of the present disclosure, the network information about each audio device includes the signal strength and the link delay between the audio device and the other audio device, $\alpha$ and $\beta$ may be set according to the practical need, and $\alpha + \beta = 1$. In a possible embodiment of the present disclosure, $Q_{ij}$ and $D_{ij}$ may be normalized to map them to a same scale, thereby to improve the rationality of the score.

To be specific, the audio devices periodically exchange their beacon frames, collect a Received Signal Strength Indication (RSSI) and a Round-Trip Time (RTT), and transmit the RSSI and the RTT to the primary audio device. The primary audio device calculates the link quality score between the audio devices through a link quality evaluation function based on the collected link data, and creates the weighted connected graph. A transmission path in which a sum of the link quality scores from the primary audio device, as a start point, to each secondary audio device is maximum is determined as the optimum transmission path using a shortest path algorithm, e.g., Dijkstra. In a case that a new audio device joins the ad-hoc network, an audio device leaves the ad-hoc network or a link state changes, the weighted connected graph and the optimum transmission path are updated in real time. In this embodiment of the present disclosure, through the algorithm, such factors as a channel state and a delay are taken into consideration, so it is able to overcome the limitation of a single index, e.g., Ad hoc On-Demand Distance Vector Routing (AODV), and ensure the high-efficient, reliable transmission of the audio data in a bad wireless transmission environment, with an end-to-end delay being within 5 ms to 10 ms.

In this embodiment of the present disclosure, in a case that the network topology of the ad-hoc network changes, i.e., an audio device leaves the synchronous audio group, an audio device joins the synchronous audio group or the network information about each audio device changes, it is necessary to re-determine the optimum transmission path. The optimum transmission path may be updated with reference to the above-mentioned method for determining the optimum transmission path, i.e., through broadcasting, by the primary audio device, the network information and determining the optimum transmission path.

Step 203: encoding and decoding to-be-played audio data to obtain target audio data.

The to-be-played audio data is obtained by the primary audio device of the ad-hoc network, and parsed to obtain an audio type of the to-be-played audio data. A target encoding algorithm is determined based on the audio type of the to-be-played audio data and network bandwidth information. Then, the to-be-played audio data is divided by the primary audio device into a plurality of original audio segments based on a predetermined frame-segmentation period of a predetermined I2S interface, and each original audio segment is encoded using the target encoding algorithm to obtain the target audio data.

In this embodiment of the present disclosure, the predetermined frame-segmentation period of the I2S interface is just an LR clock period corresponding to a channel selection signal, and the original audio segments within each I2S LR clock period are mapped to one network packet, so as to reduce an overhead of a packet header, and improve the transmission efficiency.

In this embodiment of the present disclosure, the encoding algorithm may use a lossless audio encoding format, e.g., Direct Stream Digital (DSD), so as to reduce a high-resolution sound quality loss, and audio compression encoding is performed based on Advanced Audio Distribution Profile (A2DP), so as to reduce a transmission data volume. For example, an SBC encoding algorithm or an apt-X compression algorithm is used, with a compression rate of 70%. Through an efficient audio encoding mode, it is able to reduce the audio data transmission delay while ensuring high-quality audio, and improve the audio synchronization performance between the primary audio device and the secondary audio device.

Step 204: transmitting the target audio data to a next audio device based on the optimum transmission path so that the next audio device determines whether or not the target audio data is to be forwarded based on a current number of hops corresponding to the target audio data until the target audio data is transmitted to a destination audio device in the optimum transmission path.

The primary audio device transmits the target audio data to the next audio device based on the optimum transmission path. An audio device receiving the target audio data is determined as a first audio device, and the first audio device determines whether or not the current number of hops corresponding to the target audio data is smaller than a predetermined number of hops for the optimum transmission path. In a case that the current number of hops corresponding to the target audio data is smaller than the predetermined number of hops for the optimum transmission path, the first audio device sends the target audio data to a second audio device based on the optimum transmission path, the current number of hops corresponding to the target audio data is incremented by one, and the second audio device determines whether or not the target audio data is to be forwarded. In a case that the current number of hops corresponding to the target audio data is not smaller than the predetermined number of hops for the optimum transmission path, the first audio device is determined as the destination audio device in the optimum transmission path.

Step 205: determining any audio device of the ad-hoc network as a reference clock device, and broadcasting the synchronization signal based on a predetermined clock synchronization period. The synchronization signal includes a reference playback time stamp.

In this embodiment of the present disclosure, the reference clock device may be the primary audio device or the secondary audio device, and it broadcasts the synchronization signal based on the predetermined clock synchronization period. The synchronization signal includes the reference playback time stamp and local clock information.

The local clock information about the reference clock device is taken as a reference to perform the audio synchronization on the audio devices of the ad-hoc network, and the reference playback time stamp is taken as a reference to determine a playback time stamp of the other audio device, so as to prevent the occurrence of a delay due to a hardware difference between the audio devices.

Step 206: performing clock synchronization on a target audio device and the reference clock device based on a predetermined target filtration algorithm, and determining a target playback time stamp corresponding to the target audio device based on the reference playback time stamp. The target audio device is an audio device of the ad-hoc network for receiving the synchronization signal.

Filtration is performed on a clock offset between the target audio device and the reference clock device based on the predetermined target filtration algorithm to obtain an optimum clock offset estimated value. Compensation is performed on a local clock of the target audio device based on the optimum clock offset estimated value. A transmission time value between a sound card and a loudspeaker in the target audio device is determined to obtain a delay calibration value of the target audio device. Then, the target playback time stamp corresponding to the target audio device is determined based on the reference playback time stamp and the delay calibration value of the target audio device.

In this embodiment of the present disclosure, through determining the target playback time stamp based on the delay calibration value and the reference playback time stamp, it is able to eliminate a difference between hardware parameters of the audio devices, and ensure a consistent time reference between the target audio device and the reference clock device in a case of outputting the audio data. Through combining the reference playback time stamp with the local clock after synchronization, it is able to improve the synchronous playback accuracy of the ad-hoc network, even at a microsecond level.

The clock offset is just an offset between the local clock of the target audio device and the local clock information about the reference clock device. To be specific, a difference between a reception time of the synchronization signal received by each target audio device and a sending time of the synchronization signal sent by the reference clock device is calculated to obtain a first delay time corresponding to each target audio device. A difference between a feedback reception time of a feedback signal received by the reference clock device from each target audio device and a corresponding feedback sending time is calculated to obtain a second delay time corresponding to each target audio device. Then, a half-difference operation is performed on the first delay time and the second delay time corresponding to each secondary audio device to obtain a clock offset corresponding to each secondary audio device, i.e., the clock offset between each target audio device and the reference clock device is a half of a difference between the first delay time and the second delay time.

In actual use, the reference clock device sends the synchronization signal periodically. Due to different device situations and clock drift rates of the audio devices, the clock offset calculated within each clock synchronization period may change. In this embodiment of the present disclosure, a subsequent possible clock offset is estimated using the target filtration algorithm, so as to improve the synchronization accuracy.

It should be appreciated that, in a case that the reference clock device is the primary audio device, the target audio devices may be the secondary audio devices of the ad-hoc network, and in a case that the reference clock device is a secondary audio device, the target audio devices may include the primary audio device and the other secondary audio devices, so as to improve the flexibility of the clock synchronization. In a case that the reference clock device is the secondary audio device, more computing resources are allocated by the primary audio device for processing the audio data and maintaining the network topology, and the clock synchronization of the ad-hoc network is performed by the secondary audio devices, so as to reduce the requirement on the performance of the primary audio device.

In this embodiment of the present disclosure, the target filtration algorithm is an improved Kalman filtering algorithm. To be specific, a state-space model of a clock offset is established, a state transition equation and an observation equation are created using the clock offset and a clock drift rate as state variables, and an actually-observed clock offset is calculated based on time stamp data exchanged between the primary audio device and the secondary audio device. Prediction is performed on the state transition equation using a Kalman filter to obtain a predicted clock offset and an apriori estimate of the drift rate. A Kalman gain is calculated, the apriori estimate is updated using the observation equation to obtain an aposteriori estimate, and compensation is performed on the local clock of the secondary audio device based on the aposteriori estimate to achieve the clock synchronization with the primary audio device. Then, Kalman filtration is performed based on the actually-observed clock offset to achieve the continuous, dynamic clock synchronization.

In a possible embodiment of the present disclosure, the state transition equation and the observation equation are created using a clock offset between each target audio device and the reference clock device, a clock drift rate, a network delay time and an audio buffer occupation rate as state variables. The reference clock device is controlled to exchange time stamp data with each target audio device based on the clock synchronization period to obtain a clock offset observed value corresponding to each target audio device. A clock offset within a next clock synchronization period is predicted based on a current state variable matrix and the state transition equation to obtain a clock offset predicted value corresponding to each target audio device. The state variable matrix is updated based on the observation equation, the clock offset observed value corresponding to each target audio device and the clock offset predicted value corresponding to each target audio device, and prediction is performed based on the updated state variable matrix to obtain an optimum clock offset estimated value corresponding to each target audio device. Then, the clock synchronization is performed on each target audio device of the ad-hoc network based on the optimum clock offset estimated value corresponding to each target audio device.

A specific process of the improved Kalman filtering algorithm will be described hereinafter.

A state-space model of a clock offset is established, and a state vector within a $k^{th}$ synchronization period is $X(k)=[x_1(k), x_2(k), x_3(k), x_4(k)]'$, where $x(k)$ represents the clock offset, $x_2(k)$ represents a clock drift rate, $x_3(k)$ represents a network delay time, and $x_4(k)$ represents an audio buffer occupation rate.

The state transition equation is $X(k)=F(k)\times X(k-1)+B(k)\times U(k)+W(k)$, where $X(k-1)$ represents a state vector within a $(k-1)^{th}$ synchronization period, $F(k)$ represents a state transition matrix, $B(k)$ represents a control input matrix, $U(k)$ represents a control input vector (e.g., an audio parameter adjustment value), and $W(k)$ represents a process noise which follows a multivariate Gaussian distribution having a mean of 0. Specific forms of $F(k)$ and $B(k)$ are determined based on an apriori statistical model of such parameters as audio encoding format and sampling rate, and sparse representation is used to reduce the computing complexity.

An observation vector within the $k^{th}$ synchronization period is $Z(k)=[z_1(k), z_2(k)]^T$, where $z_1(k)$ represents a clock offset observed via exchanging the time stamp, i.e., a clock offset observed value, and $z_2(k)$ represents an audio buffer occupation rate actually measured.

The observation equation is represented as $Z(k)=H(k)\times X(k)+V(k)$, where $H(k)$ represents an observation matrix, and $V(k)$ represents an observation noise which follows a multivariate Gaussian distribution having a mean of 0. A specific form of $H(k)$ is determined based on a structure of the network topology, and spatial correlation of the observation noise among different audio devices is taken into consideration.

A state variable at a next moment is predicted using the state transition equation based on the clock offset observed value corresponding to each target audio device, and calibration is performed on a prediction result using the observation equation to obtain optimum estimated values of the clock offset and the drift rate.

A prediction process of the target filtration algorithm will be described as follows. $X'(k|k-1)=F(k)\times X'(k-1|k-1)+B(k)\times U(k)$, where $X'(k|k-1)$ represents a prediction estimated value of a state within the $k^{th}$ synchronization period, and $X'(k-1|k-1)$ represents a prediction estimated value of a state within the $(k-1)^{th}$ synchronization period.

$P(k|k-1)=F(k)\times P(k-1|k-1)\times F(k)^T+Q(k)$, where $P(k|k-1)$ represents that the $k^{th}$ synchronization period is a predicted value of a covariance, $P(k-1|k-1)$ represents that the $(k-1)^{th}$ synchronization period is a predicted value of a covariance, and $Q(k)$ represents a covariance matrix of the process noise.

An updating process of the target filtration algorithm will be described as follows: $K(k)=P(k|k-1)\times H(k)^T\times (H(k)\times P(k|k-1)\times H(k)^T+R(k))^{-1}$, $X'(k|k)=X'(k|k-1)+K(k)*(Z(k)-H(k)*X'(k|k-1))$ and, $P(k|k)=(I-K(k)\times H(k))\times P(k|k-1)$, where $K(k)$ represents a Kalman gain matrix within the $k^{th}$ synchronization period and it is optimized in real time using a gradient descent algorithm, and $R(k)$ represents a covariance matrix of the observation noise within the $k^{th}$ synchronization period.

Through the iteration of the prediction process and the updating process, an optimum estimation trajectory of each state variable may be obtained. The estimated clock offset is applied to the compensation on the local clock of the secondary audio device, so as to achieve the clock synchronization with the primary audio device.

For ease of understanding, an example is provided herein. In a wireless audio system consisting of one primary audio device and four secondary audio devices, the clock synchronization is performed using the above-mentioned improved Kalman filtering algorithm. In this system, a sampling rate is 44.1 kHz, and an audio format is 16 bit PCM.

At an initial stage of the algorithm, a covariance matrix of the process noise is set as $Q(k)=\text{diag}([1e-8, 1e-10, 1e-6, 1e-4])$, a covariance matrix of the observation noise is set as $R(k)=\text{diag}([1e-6, 1e-2])$, and a Kalman gain matrix is set as $K(k)=0.5*\text{eye}(4)$.

During the operation of the system, the synchronization period is triggered once per 10 seconds to exchange the time stamp data. The state vector of each target audio device is dynamically estimated using the above-mentioned improved Kalman filtering algorithm based on the observed data. Then, the compensation is performed on the local clock of the secondary audio device based on the estimated clock offset.

In this embodiment of the present disclosure, a corresponding improvement is introduced into a conventional Kalman filtering framework to establish a clock offset dynamic model including a plurality of key state variables, with such factors as a clock system and a network condition being taken into consideration. Apriori knowledge and statistical characteristics of the multi-room audio system are fully utilized, and a control input mechanism is introduced, so as to adjust the clock synchronization more flexibly. A plurality of observable quantities is used to improve the applicability and robustness of the algorithm. As compared with a conventional least square estimation method or PI control method, this algorithm may adapt to a complicated and changeable network environment, and dynamically track a change of a system state, so as to remarkably improve the estimation accuracy and reduce a random error. Experiments show that, through this algorithm, a synchronization error is controlled to be at a sub-microsecond level, so as to facilitate the immersive experience of the audio at a high synchronization level, thereby to improve the synchronization accuracy and the robustness while reducing the computing complexity. In addition, the clock synchronization is combined with audio scheduling, so as to further optimize the system performance, thereby to improve the synchronization accuracy, and improve the multi-room audio playback.

Step 207: controlling each audio device of the ad-hoc network based on the synchronization parameter to synchronously play the target audio data.

A playback time stamp corresponding to each audio device of the ad-hoc network is determined based on the synchronization parameter, and the target audio data is played by each audio device of the ad-hoc network based on a local clock after synchronization and the playback time stamp corresponding to each audio device.

According to the embodiments of the present disclosure, the plurality of audio devices supporting the target wireless communication protocol forms the ad-hoc network covering a plurality of rooms via point-to-point connection, and each audio device dynamically analyzes the link quality to select the transmission path with a smallest delay and dynamically optimizes the network topology via multi-hop relay, so it is able to reduce a transmission delay, and transmit high-resolution audio data between the audio devices without any sound quality loss. In addition, the audio device performs the real-time interaction and the dynamic compensation based on the synchronization signal, so it is able to improve the synchronous playback accuracy, and meet the requirement on the synchronization between sound and image.

Figure 3:
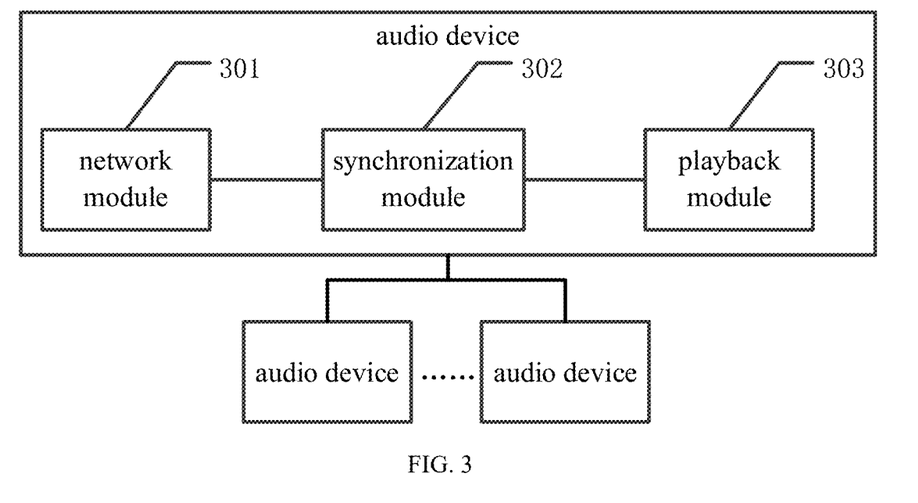
FIG. 3 is a block diagram of a multi-room audio synchronous playback system according to an embodiment of the present disclosure.

The multi-room audio synchronous playback method has been described hereinabove, and a multi-room audio synchronous playback system will be described hereinafter. Referring to FIG. 3, in one embodiment of the present disclosure, the multi-room audio synchronous playback system includes a plurality of audio devices supporting a target wireless communication protocol. The plurality of audio devices forms an ad-hoc network covering a plurality of rooms via point-to-point connection, and the target wireless communication protocol operates at a frequency band of 5 GHz to 7 GHz.

Each audio device includes: a network module 301 configured to dynamically analyze link quality to select an optimum transmission path, and dynamically optimize a network topology of the ad-hoc network via multi-hop relay; a synchronization module 302 configured to transmit target audio data between the audio devices of the ad-hoc network based on the optimum transmission path, and perform real-time interaction and dynamic compensation based on a synchronization signal to obtain a synchronization parameter; and a playback module 303 configured to synchronously play the target audio data based on a playback time stamp carried in the synchronization signal.

According to the embodiments of the present disclosure, the plurality of audio devices supporting the target wireless communication protocol forms the ad-hoc network covering a plurality of rooms via point-to-point connection, and each audio device dynamically analyzes the link quality to select the transmission path with a smallest delay and dynamically optimizes the network topology via multi-hop relay, so it is able to reduce a transmission delay, and transmit high-resolution audio data between the audio devices without any sound quality loss. In addition, the audio device performs the real-time interaction and the dynamic compensation based on the synchronization signal, so it is able to improve the synchronous playback accuracy, and meet the requirement on the synchronization between sound and image.

Figure 4:
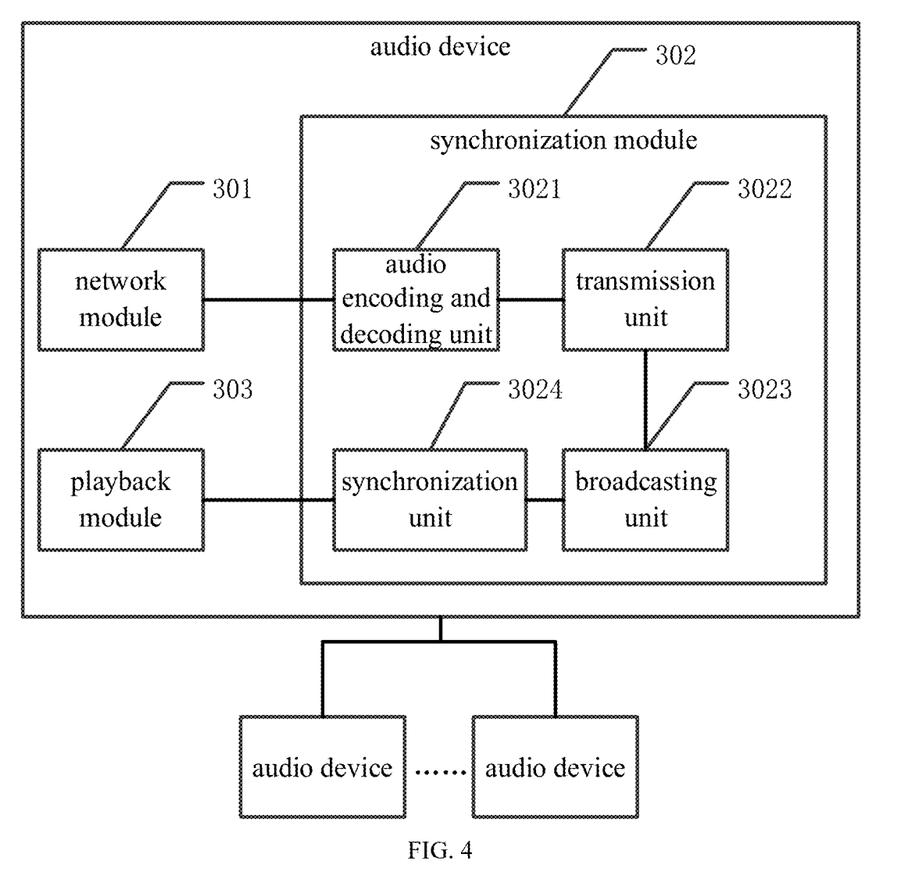
FIG. 4 is another block diagram of the multi-room audio synchronous playback system according to an embodiment of the present disclosure.

Referring to FIG. 4, in another embodiment of the present disclosure, the multi-room audio synchronous playback system includes a plurality of audio devices supporting a target wireless communication protocol. The plurality of audio devices forms an ad-hoc network covering a plurality of rooms via point-to-point connection, and the target wireless communication protocol operates at a frequency band of 5 GHz to 7 GHz.

Each audio device includes: a network module 301 configured to dynamically analyze link quality to select an optimum transmission path, and dynamically optimize a network topology of the ad-hoc network via multi-hop relay; a synchronization module 302 configured to transmit target audio data between the audio devices of the ad-hoc network based on the optimum transmission path, and perform real-time interaction and dynamic compensation based on a synchronization signal to obtain a synchronization parameter; and a playback module 303 configured to synchronously play the target audio data based on a playback time stamp carried in the synchronization signal.

In a possible embodiment of the present disclosure, the network module 301 is specifically configured to: determine any audio device of the ad-hoc network as a primary audio device; detect, by the primary audio device, neighboring audio devices based on a first predetermined period to obtain network information about each secondary audio device, and broadcast network information about the primary audio device to the neighboring audio devices; determine a link quality score between any two audio devices based on the network information about each audio device using an equation $L_i(X_i,X_j)=\alpha*Q_{ij}+\beta*D_{ij}$, where $L_i(X_i,X_j)$ represents a link quality score between an audio device $X_i$ and an audio device $X_j$, $Q_{ij}$ represents signal strength of a link between $X_i$ and $X_j$, $D_{ij}$ represents a link delay, and $\alpha$ and $\beta$ are weighting coefficients; create a weighted connected graph based on the link quality score, and determine a transmission path in which a sum of the link quality scores from the primary audio device to each secondary audio device is maximum as the optimum transmission path; and in a case that the network topology of the ad-hoc network changes, update the optimum transmission path for the primary audio device and each secondary audio device.

In a possible embodiment of the present disclosure, the synchronization module 302 includes: an audio encoding and decoding unit 3021 configured to encode and decode to-be-played audio data to obtain the target audio data; a transmission unit 3022 configured to transmit the target audio data to a next audio device based on the optimum transmission path so that the next audio device determines whether or not the target audio data is to be forwarded based on a current number of hops corresponding to the target audio data until the target audio data is transmitted to a destination audio device in the optimum transmission path; a broadcasting unit 3023 configured to determine any audio device of the ad-hoc network as a reference clock device, and broadcast the synchronization signal based on a predetermined clock synchronization period, the synchronization signal including a reference playback time stamp; and a synchronization unit 3024 configured to perform clock synchronization on a target audio device and the reference clock device based on a predetermined target filtration algorithm, and determine a target playback time stamp corresponding to the target audio device based on the reference playback time stamp, the target audio device being an audio device of the ad-hoc network for receiving the synchronization signal.

In a possible embodiment of the present disclosure, the synchronization unit 3024 is specifically configured to: perform filtration on a clock offset between the target audio device and the reference clock device based on a predetermined target filtration algorithm to obtain an optimum clock offset estimated value; perform compensation on a local clock of the target audio device based on the optimum clock offset estimated value; determine a transmission time value between a sound card and a loudspeaker in the target audio device to obtain a delay calibration value of the target audio device; and determine the target playback time stamp corresponding to the target audio device based on the reference playback time stamp and the delay calibration value of the target audio device.

In a possible embodiment of the present disclosure, the transmission unit 3022 is specifically configured to: transmit, by the primary audio device, the target audio data to the next audio device based on the optimum transmission path; determine an audio device receiving the target audio data as a first audio device, so that the first audio device determines whether or not the current number of hops corresponding to the target audio data is smaller than a predetermined number of hops for the optimum transmission path; in a case that the current number of hops corresponding to the target audio data is smaller than the predetermined number of hops for the optimum transmission path, send, by the first audio device, the target audio data to a second audio device based on the optimum transmission path, increment the current number of hops corresponding to the target audio data by one, and determine, by the second audio device, whether or not the target audio data is to be forwarded; and in a case that the current number of hops corresponding to the target audio data is not smaller than the predetermined number of hops for the optimum transmission path, determine the first audio device as the destination audio device in the optimum transmission path.

In a possible embodiment of the present disclosure, the audio encoding and decoding unit 3021 is specifically configured to: obtain, by the primary audio device of the ad-hoc network, the to-be-played audio data, and parse the to-be-played audio data to obtain an audio type of the to-be-played audio data; determine a target encoding algorithm based on the audio type of the to-be-played audio data and network bandwidth information; and divide, by the primary audio device, the to-be-played audio data into a plurality of original audio segments based on a predetermined frame-segmentation period of a predetermined I2S interface, and encode each original audio segment using the target encoding algorithm to obtain the target audio data.

In a possible embodiment of the present disclosure, the playback module 303 is specifically configured to: determine a playback time stamp corresponding to each audio device of the ad-hoc network based on the synchronization parameter; and play, by each audio device of the ad-hoc network, the target audio data based on a local clock after synchronization and the playback time stamp corresponding to each audio device.

According to the embodiments of the present disclosure, the plurality of audio devices supporting the target wireless communication protocol forms the ad-hoc network covering a plurality of rooms via point-to-point connection, and each audio device dynamically analyzes the link quality to select the transmission path with a smallest delay and dynamically optimizes the network topology via multi-hop relay, so it is able to reduce a transmission delay, and transmit high-resolution audio data between the audio devices without any sound quality loss. In addition, the audio device performs the real-time interaction and the dynamic compensation based on the synchronization signal, so it is able to improve the synchronous playback accuracy, and meet the requirement on the synchronization between sound and image.

The multi-room audio synchronous playback system has been described in details hereinabove with reference to FIGS. 3-4 in terms of modular functional entities. A computer device in the embodiments of the present disclosure will be described in details hereinafter in terms of hardware.

Figure 5:
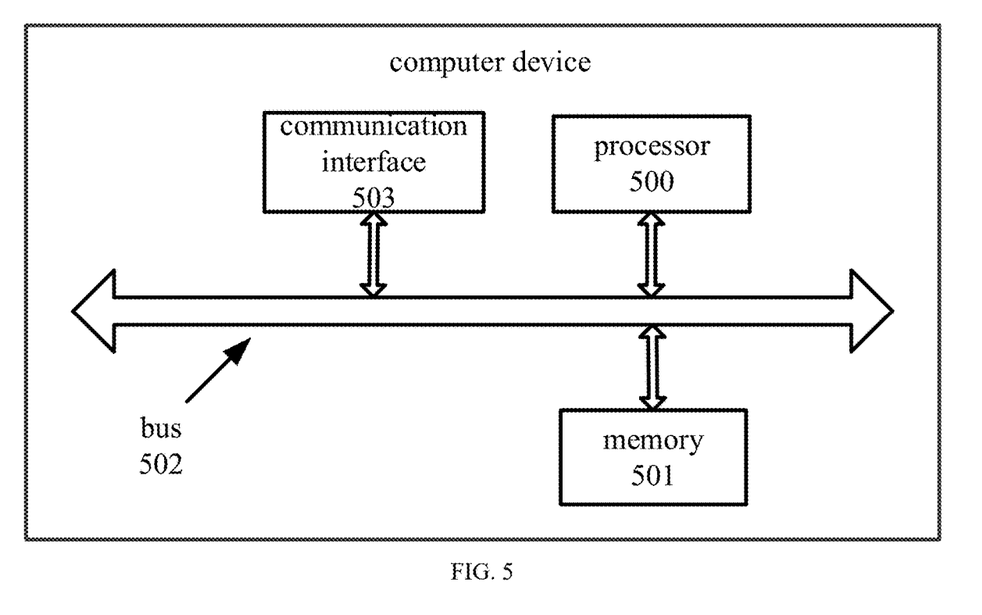
FIG. 5 is a block diagram of a computer device according to an embodiment of the present disclosure.

Referring to FIG. 5, the computer device includes a processor 500 and a memory 501. The memory 501 stores therein a machine-executable instruction executed by the processor 500. The processor 500 executes the machine-executable instruction so as to implement the above-mentioned multi-room audio synchronous playback method.

The computer device in FIG. 5 further includes a bus 502 and a communication interface 503. The processor 500, the communication interface 503 and the memory 501 are connected to each other via the bus 502.

The memory 501 may include a high-speed Random Access Memory (RAM), or a non-volatile memory, e.g., at least one magnetic disk. A system network element is in communication with at least one of other network elements via at least one communication interface 503 (in a wired or wireless manner), and Internet, wide area network, local area network, metropolitan area network or the like may be used. The bus 502 may be an ISA bus, a PCI bus or an EISA bus. The bus includes an address bus, a data bus or a control bus. For convenience, the bus is indicated by a double-sided arrow in FIG. 5, but it does not mean that there is merely one bus or there is merely one type of bus.

The processor 500 may be an integrated circuit (IC) having a signal processing capability. During the implementation, the steps of the above-mentioned method may be completed through an integrated logic circuit of hardware in the processor 500 or instructions in the form of software. The processor 500 may be a general-purpose processor (including a Central Processing Unit (CPU), a Network Processor (NP), etc), a Digital Signal Processor (DSP), an Application-Specific Integrated Circuit (ASIC), a Field Programmable Gate Array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 501, and the processor 500 may read information stored in the memory 501 so as to implement the steps of the method in conjunction with the hardware.

The present disclosure further provides in some embodiments a computer-readable storage medium. The computer-readable storage medium may be a non-volatile computer-readable storage medium, or a volatile computer-readable storage medium. The computer-readable storage medium stores therein an instruction, and the instruction is executed by a computer to implement the steps of the above-mentioned multi-room audio synchronous playback method.

It should be appreciated that, for convenience and clarification, operation procedures of the system, device and units described hereinabove may refer to the corresponding procedures in the method embodiment, and thus will not be particularly defined herein.

In the case that the units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above-mentioned embodiments are for illustrative purposes only, but shall not be used to limit the scope of the present disclosure. Although the present disclosure has been described in details with reference to the embodiments, a person skilled in the art may make various modifications and substitutions without departing from the spirit of the present disclosure, and these modifications and substitutions shall also fall within the scope of the present disclosure.

What is claimed is:

1. A multi-room audio synchronous playback method, comprising:

creating an ad-hoc network using a plurality of audio devices supporting a target wireless communication protocol via point-to-point connection, wherein the ad-hoc network covers a plurality of rooms, and the target wireless communication protocol operates at a frequency band of 5 GHz to 7 GHz;

dynamically analyzing a link quality to select an optimum transmission path, and dynamically optimizing a network topology of the ad-hoc network via a multi-hop relay;

transmitting target audio data between the plurality of audio devices of the ad-hoc network based on the optimum transmission path, and performing a real-time interaction and a dynamic compensation based on a synchronization signal to obtain a synchronization parameter; and controlling each of the plurality of audio devices of the ad-hoc network based on the synchronization parameter to synchronously play the target audio data;

wherein transmitting the target audio data between the plurality of audio devices of the ad-hoc network based on the optimum transmission path and performing the real-time interaction and the dynamic compensation based on the synchronization signal to obtain the synchronization parameter comprise:

encoding and decoding to-be-played audio data to obtain the target audio data;

transmitting the target audio data to a next audio device based on the optimum transmission path so that the next audio device determines whether or not the target audio data is to be forwarded based on a current number of hops corresponding to the target audio data until the target audio data is transmitted to a destination audio device in the optimum transmission path;

determining any audio device of the ad-hoc network as a reference clock device, and broadcasting the synchronization signal based on a predetermined clock synchronization period, wherein the synchronization signal comprises a reference playback time stamp; and performing a clock synchronization on a target audio device and the reference clock device based on a predetermined target filtration algorithm, and determining a target playback time stamp corresponding to the target audio device based on the reference playback time stamp, wherein the target audio device is an audio device of the ad-hoc network for receiving the synchronization signal;

wherein performing the clock synchronization on the target audio device and the reference clock device based on the predetermined target filtration algorithm comprises:

creating a state transition equation and an observation equation using a clock offset between each target audio device and the reference clock device, a clock drift rate, a network delay time and an audio buffer occupation rate as state variables;

controlling the reference clock device to exchange time stamp data with each target audio device based on the predetermined clock synchronization period to obtain a clock offset observed value corresponding to each target audio device;

predicting a clock offset within a next clock synchronization period based on a current state variable matrix and the state transition equation to obtain a clock offset predicted value corresponding to each target audio device;

updating the current state variable matrix based on the observation equation, the clock offset observed value corresponding to each target audio device and the clock offset predicted value corresponding to each target audio device to obtain an updated state variable matrix, and performing a prediction based on the updated state variable matrix to obtain an optimum clock offset estimated value corresponding to each target audio device; and performing the clock synchronization on each target audio device of the ad-hoc network based on the optimum clock offset estimated value corresponding to each target audio device.

2. The multi-room audio synchronous playback method according to claim 1, wherein a format of the target audio data is a 24 bit/192 kHz pulse code modulation (PCM) format.

3. The multi-room audio synchronous playback method according to claim 1, wherein the ad-hoc network comprises a primary audio device and a plurality of secondary audio devices; and the primary audio device is configured to distribute the target audio data and the synchronization signal to the plurality of secondary audio devices and dynamically maintain the network topology.

4. The multi-room audio synchronous playback method according to claim 1, wherein the target wireless communication protocol is a wireless fidelity-6 extended (WIFI-6E) protocol.

5. The multi-room audio synchronous playback method according to claim 1, wherein dynamically analyzing the link quality to select the optimum transmission path and dynamically optimizing the network topology of the ad-hoc network via the multi-hop relay comprise:

determining any audio device of the ad-hoc network as a primary audio device;

detecting, by the primary audio device, neighboring audio devices based on a first predetermined period to obtain network information about each of a plurality of secondary audio devices, and broadcasting network information about the primary audio device to the neighboring audio devices;

determining a link quality score between any two audio devices based on network information about each of the plurality of audio devices using an equation $L_t(X_i,X_j)= \alpha*Q_{ij}+\beta*D_{ij}$, wherein $L_t(X_i,X_j)$ represents a link quality score between an audio device $X_i$ and an audio device $X_j$, $Q_{ij}$ represents a signal strength of a link between the audio device $X_i$ and the audio device $X_j$, $D_{ij}$ represents a link delay, and $\alpha$ and $\beta$ are weighting coefficients;

creating a weighted connected graph based on the link quality score, and determining a transmission path with a maximum sum of the link quality scores from the primary audio device to each of the plurality of secondary audio devices as the optimum transmission path; and in a case that the network topology of the ad-hoc network changes, updating the optimum transmission path for the primary audio device and each of the plurality of secondary audio devices.

6. The multi-room audio synchronous playback method according to claim 1, wherein determining the target playback time stamp corresponding to the target audio device based on the reference playback time stamp comprises:

determining a transmission time value between a sound card and a loudspeaker in the target audio device to obtain a delay calibration value of the target audio device; and determining the target playback time stamp corresponding to the target audio device based on the reference playback time stamp and the delay calibration value of the target audio device.

7. The multi-room audio synchronous playback method according to claim 1, wherein transmitting the target audio data to the next audio device based on the optimum transmission path so that the next audio device determines whether or not the target audio data is to be forwarded based on the current number of hops corresponding to the target audio data until the target audio data is transmitted to the destination audio device in the optimum transmission path comprises:

transmitting, by a primary audio device, the target audio data to the next audio device based on the optimum transmission path;

determining an audio device receiving the target audio data as a first audio device, and determining, by the first audio device, whether or not the current number of hops corresponding to the target audio data is smaller than a predetermined number of hops for the optimum transmission path;

in a case that the current number of hops corresponding to the target audio data is smaller than the predetermined number of hops for the optimum transmission path, sending, by the first audio device, the target audio data to a second audio device based on the optimum transmission path, incrementing the current number of hops corresponding to the target audio data by one, and determining, by the second audio device, whether or not the target audio data is to be forwarded; and in a case that the current number of hops corresponding to the target audio data is greater than or equal to the predetermined number of hops for the optimum transmission path, determining the first audio device as the destination audio device in the optimum transmission path.

8. The multi-room audio synchronous playback method according to claim 1, wherein encoding and decoding the to-be-played audio data to obtain the target audio data comprises:
obtaining, by a primary audio device of the ad-hoc network, the to-be-played audio data, and parsing the to-be-played audio data to obtain an audio type of the to-be-played audio data;
determining a target encoding algorithm based on the audio type of the to-be-played audio data and network bandwidth information; and
dividing, by the primary audio device, the to-be-played audio data into a plurality of original audio segments based on a predetermined frame-segmentation period of a predetermined I2S interface, and encoding each of the plurality of original audio segments using the target encoding algorithm to obtain the target audio data.

9. The multi-room audio synchronous playback method according to claim 1, wherein controlling each of the plurality of audio devices of the ad-hoc network based on the synchronization parameter to synchronously play the target audio data comprises:
determining a playback time stamp corresponding to each of the plurality of audio devices of the ad-hoc network based on the synchronization parameter; and
playing, by each of the plurality of audio devices of the ad-hoc network, the target audio data based on a local clock after synchronization and the playback time stamp corresponding to each of the plurality of audio devices.

10. A multi-room audio synchronous playback system, comprising a plurality of audio devices supporting a target wireless communication protocol, wherein the plurality of audio devices forms an ad-hoc network covering a plurality of rooms via point-to-point connection, and the target wireless communication protocol operates at a frequency band of 5 GHz to 7 GHZ,
wherein each of the plurality of audio devices comprises:
a network module configured to dynamically analyze a link quality to select an optimum transmission path, and dynamically optimize a network topology of the ad-hoc network via a multi-hop relay;
a synchronization module configured to transmit target audio data between the plurality of audio devices of the ad-hoc network based on the optimum transmission path, and perform a real-time interaction and a dynamic compensation based on a synchronization signal to obtain a synchronization parameter; and
a playback module configured to synchronously play the target audio data based on a playback time stamp carried in the synchronization signal;
wherein the synchronization module is further configured to:
encode and decode to-be-played audio data to obtain the target audio data;
transmit the target audio data to a next audio device based on the optimum transmission path so that the next audio device determines whether or not the target audio data is to be forwarded based on a current number of hops corresponding to the target audio data until the target audio data is transmitted to a destination audio device in the optimum transmission path;
determine any audio device of the ad-hoc network as a reference clock device, and broadcast the synchronization signal based on a predetermined clock synchronization period, wherein the synchronization signal comprises a reference playback time stamp; and
perform a clock synchronization on a target audio device and the reference clock device based on a predetermined target filtration algorithm, and determine a target playback time stamp corresponding to the target audio device based on the reference playback time stamp, wherein the target audio device is an audio device of the ad-hoc network for receiving the synchronization signal;
wherein performing the clock synchronization on the target audio device and the reference clock device based on the predetermined target filtration algorithm comprises:
creating a state transition equation and an observation equation using a clock offset between each target audio device and the reference clock device, a clock drift rate, a network delay time and an audio buffer occupation rate as state variables;
controlling the reference clock device to exchange time stamp data with each target audio device based on the predetermined clock synchronization period to obtain a clock offset observed value corresponding to each target audio device;
predicting a clock offset within a next clock synchronization period based on a current state variable matrix and the state transition equation to obtain a clock offset predicted value corresponding to each target audio device;
updating the current state variable matrix based on the observation equation, the clock offset observed value corresponding to each target audio device and the clock offset predicted value corresponding to each target audio device to obtain an updated state variable matrix, and performing a prediction based on the updated state variable matrix to obtain an optimum clock offset estimated value corresponding to each target audio device; and
performing the clock synchronization on each target audio device of the ad-hoc network based on the optimum clock offset estimated value corresponding to each target audio device.

11. The multi-room audio synchronous playback system according to claim 10, wherein the plurality of audio devices comprises one or more of a television, a projector, a surround sound speaker, a bass speaker or a soundbar.

12. A computer device, comprising a memory, a processor and a computer program stored in the memory and executed by the processor, wherein the computer program is executed by the processor to implement the multi-room audio synchronous playback method according to claim 1.

13. A computer-readable storage medium, storing a computer program, wherein the computer program is executed by a processor to implement the multi-room audio synchronous playback method according to claim 1.

* * * * *